May 25, 1937.  G. F. MYERS  2,081,151
FLYING MACHINE
Original Filed April 7, 1932
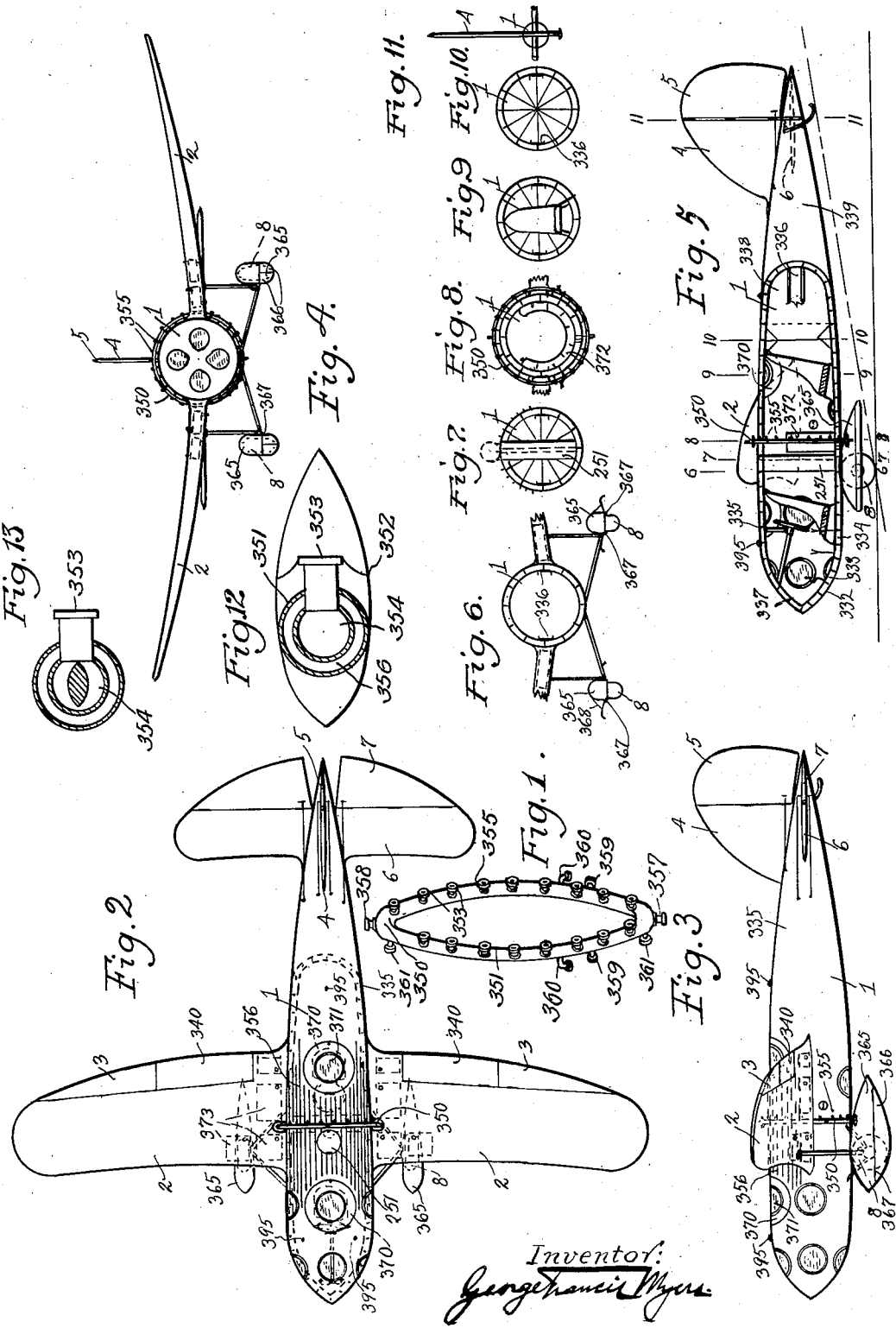
Inventor:
George Francis Myers Patented May 25, 1937

2,081,151

UNITED STATES PATENT OFFICE 2,081,151

FLYING MACHINE

George Francis Myers, New York, N. Y.

Application April 7, 1932, Serial No. 603,765
Renewed May 26, 1936

10 Claims. (Cl. 244—52)

This invention relates to flying machines.

It has for its object to produce a machine that will navigate efficiently in the stratosphere. Another object is to produce a machine that can be directed and stabilized while in thin air.

These and other objects and specific features and improvements, and the like, will now be described and then specifically pointed out in the claims.

The machine as shown is an ordinary airplane or glider with rocket motors arranged in a circle around the center of gravity or adjacent thereto; so that the center of gravity, the center of lift and the center of push will all be concentrated, substantially, at the best engineering position. Of course at very great heights the lift of the wings would be next to nothing on account of the extreme rarefaction of the stratosphere, but because of the tremendous speeds at which the machine would travel,—1200, 1500, 2000 and possibly 5000 miles per hour,—there would be but little sustentation per square foot of surface necessary, and only a very small pair of wings will be needed.

In the accompanying drawing which shows the preferred embodiment of the invention:

Figure 1 is a perspective view of a power ring with its explosion or rocket motors.

Fig. 2 is a plan view of the rocket propelled machine with the power ring in place.

Fig. 3 is a side elevation thereof.

Fig. 4 is a front elevation thereof.

Fig. 5 is a similar view to Fig. 3 but with the side cover removed showing the inside of the airplane.

Fig. 6 is a transverse cross section on the line 6—6 of Fig. 5.

Fig. 7 is a cross section on the line 7—7 of Fig. 5.

Fig. 8 is a transverse cross section on the line 8—8 of Fig. 5 showing the U shaped gasolene tank on the inside of the fuselage, and the power ring on the outside thereof with a plurality of rocket motors thereon pointing in different directions.

Fig. 9 is a transverse cross section on the line 9—9 of Fig. 5 showing one of the chairs reaching from floor to roof.

Fig. 10 is a transverse cross section on the line 10—10 of Fig. 5 showing the cross wires inside the fuselage helping to prevent the bursting open of the fuselage in the higher reaches of the stratosphere.

Fig. 11 is a transverse cross section on the line 11—11 of Fig. 5 and shows the rudder post and elevator rods.

Fig. 12 shows a section of the ring enlarged with its stream lined covering and the circular water pipe surrounding the explosion chambers of each of the rocket motors.

Fig. 13 shows a power ring having an air cooled system.

The invention is constructed and operated substantially and preferably as follows:

The airplane 1 has a fuselage built up of two concentric rings or cylinders 332 and 333 which are of corrugated metal, which greatly increases its strength against exploding or bursting in the intensely rarefied air in which it is designed to travel. The space 334 between the two corrugated rings and the outside smooth cover 335 may be filled with compressed air greatly augmenting its strength, or the same can be filled more or less with anti-noise and anti-cold mixture to keep out the noise of the rocket motors and the intense cold of the upper regions of the stratosphere. The said space may if desired have a stream of warm air passing through it. Longérons 336 give strength longitudinally. The portion of the fuselage to be kept air tight for the pilot and navigator is between the nose 337 and the rear portion thereof 338. A non-air tight portion 339 is mounted aft of the air-tight portion. The said after portion holds the tail unit with fin 4, vertical rudder 5, stabilizing plane 6 and elevator 7. The wings 2 are attached to the fuselage at dihedral angles. The ailerons 3 are at the rear tips of the wing and the flaps 340 are in line therewith. The parachute case 251 holds one or more parachutes.

Surrounding the fuselage adjacent to the center of gravity thereof is the power ring 350. This ring consists of a pipe 351 with its stream-lined covering 352 thereover, except of course where the nozzles 353 of the rocket motors project. This pipe is large enough to permit a stream of cooling liquid to pass over the explosion chambers 354 of the rocket motors 355 to cool the same; the liquid flowing through the space 356 between the pipe 351 and the explosion chamber 354 and passes through the radiator 356' mounted along the outside of the fuselage as in ordinary airplane practice.

These explosion chambers may, however, be cooled by the intense cold air in the stratosphere by the fins surrounding the chamber. The portions between the chambers are made of stream lined material.

The rocket motors 355 are for the most part pointed rearward, as the main object or function of these motors is to propel the machine forward. There are however as may be seen several of the motors pointing in other directions. The motors 361 for instance are retrogression motors to stop the forward progression of the machine, when coming to a landing place. The motor 357 is a lifting motor to be used in case of sudden necessity when it is necessary to push up the machine into higher strata in case it is inconvenient or undesirable to use the elevator 7. (For it should be remembered that at the tremendous speeds at which the machine will travel, the least change in any of the controls would swerve the machine around in a highly dangerous manner; therefore probably an "iron man" or a set of gyroscopes will be employed to take charge of all the controls while the machine is in the stratosphere.)

Another motor 358 pointing upwards will be used to push the machine down if it is traveling in too high a stratum for its safety from bursting, and one does not wish to or must not wait for slower gravity to act. The drift motors 359 take care of too much sideway travel. The motors 360 turn the machine on its longitudinal axis one way or the other. Also the upper retrogression motor 361 with its lower companion motor used separately will turn the machine on its transverse axis. Any one of the pusher motors 355 on one side or the other of the fuselage when used separately will turn the machine on its vertical axis. Therefore the machine can be stabilized on all three of its main axes by the rocket motors on the power ring.

The wheels 8 are encased or enclosed in streamlined covering or pants 365, but as shown the whole wheel is encased,—the lower portion 366 being hinged as at 367 and cord 368 leading to the pilot's seat.

The hatchways 370 are mounted along the median line of the machine and the hatches thereover have windows 371 therein being directly over the seats so that it is easy to enter the machine. The tank 372 for the gasolene is inside the machine where it is warm, and the tanks 373 for the liquid oxygen are in the wings where it is cold.

As my invention is in some of its aspects generic, I do not limit myself to the particular construction shown and described, but also contemplate the employment of such equivalents as fairly fall within the scope of the claims.

In this connection I may state that the plane of the stratosphere machine, or stratodyne (power in the upper layer) may be of any shape or size or number; and that the power ring may take the form of the contour of the fuselage, either all of the way around the same or part way around thereof.

Therefore it should be understood that I may make various changes in the form, proportion, size and detail of the structures shown and described, the number and position of certain elements used, as well as the character of the motive power employed, without departing from the spirit of the invention.

I claim:

1. In combination with a flying machine, of a plurality of rocket motors and a streamlined ring connecting the same and carrying cooling liquid.

2. In combination with a flying machine, of a fuselage, a ring mounted around the fuselage, and a plurality of rocket motors pointing rearward, forward, up, down and sideways and all attached to the ring.

3. In combination with a flying machine, of a fuselage, a ring mounted around the fuselage, and a plurality of rocket motors pointing rearward, forward, up, down, sideways and circumferentially and all attached to the ring.

4. In combination with a flying machine, of a fuselage, a ring encircling the fuselage but of larger diameter, a plurality of rocket motors mounted on the ring, and means for operating the motors to stabilize the machine on its three major axes.

5. The combination in a flying machine, of a fuselage, a ring mounted on the fuselage, a rocket motor pointing toward the forward portion of the fuselage and mounted on the ring for stopping the progress of the machine in the air, and means for operating the motor.

6. The combination in a flying machine, of a fuselage, a ring mounted on the fuselage, a plurality of rocket motors pointing upward and downward mounted on the ring for depressing and raising the machine, and means for operating the motors.

7. The combination in a flying machine, of a fuselage, two rocket motors mounted circumferentially to the fuselage both pointing in the same direction for turning the machine on its longitudinal axis, and means for operating one of the motors independently of the other.

8. The combination in a flying machine, of a fuselage, a ring on the fuselage, two rocket motors mounted circumferentially on the ring for turning the machine on its longitudinal axis both motors pointing in the same direction, and means for operating one of the motors independently of the other.

9. The combination in a flying machine, of a fuselage, four rocket motors mounted circumferentially to the fuselage one on each side pointing downwardly and one upwardly for turning the machine on its longitudinal axis, and means for operating the motors reversely.

10. The combination in a flying machine, of a fuselage, a ring on the fuselage, four rocket motors mounted circumferentially to the fuselage one thereof on each side pointing downwardly and one upwardly for turning the machine on its longitudinal axis, and means for operating the motors reversely.

GEORGE FRANCIS MYERS.